US012302477B2

(12) United States Patent
Bickel et al.

(10) Patent No.: US 12,302,477 B2
(45) Date of Patent: May 13, 2025

(54) INDUCTION HEATING FOR PROCESS ELECTRIFICATION

(71) Applicants: Schneider Electric USA, Inc., Boston, MA (US); Schneider Electric Systems USA, Inc., Foxborough, MA (US)

(72) Inventors: Jon A. Bickel, Murfreesboro, TN (US); Lanyon Carr, Gold River, CA (US)

(73) Assignees: SCHNEIDER ELECTRIC SYSTEMS USA, INC., Foxborough, MA (US); SCHNEIDER ELECTRIC USA, INC., Boston, MA (US)

( * ) Notice: Subject to any disclaimer, the term of this patent is extended or adjusted under 35 U.S.C. 154(b) by 0 days.

(21) Appl. No.: 18/232,607

(22) Filed: Aug. 10, 2023

(65) Prior Publication Data

US 2024/0324074 A1 Sep. 26, 2024

Related U.S. Application Data

(60) Provisional application No. 63/454,523, filed on Mar. 24, 2023.

(51) Int. Cl.
*H05B 6/06* (2006.01)
*H05B 6/10* (2006.01)

(52) U.S. Cl.
CPC ............... *H05B 6/06* (2013.01); *H05B 6/108* (2013.01)

(58) Field of Classification Search
CPC ................................. H05B 6/06; H05B 6/108
USPC ....... 219/628, 629, 630, 632, 635, 631, 601, 219/669, 667, 670
See application file for complete search history.

(56) References Cited

U.S. PATENT DOCUMENTS

| | | | | | |
|---|---|---|---|---|---|
| 2,178,721 | A * | 11/1939 | Daniels | F16L 59/16 137/341 |
| 5,525,782 | A * | 6/1996 | Yoneno | H05B 6/6458 219/401 |
| 9,908,091 | B2 | 3/2018 | Vogel et al. | |
| 10,011,774 | B2 | 7/2018 | Bianchina et al. | |
| 11,059,010 | B2 | 7/2021 | Mortensen et al. | |
| 11,882,629 | B2 | 1/2024 | Klingler et al. | |
| 2015/0144304 | A1 * | 5/2015 | Schneider | B22D 41/01 165/104.17 |

(Continued)

FOREIGN PATENT DOCUMENTS

| | | | |
|---|---|---|---|
| CN | 218393624 | U | 1/2023 |
| WO | 2020254184 | A1 | 12/2020 |

(Continued)

OTHER PUBLICATIONS

Wismann, S., "Electrically heated steam methane reforming", Technical University of Denmark, Department of Physics Surface Science and Catalysis, Aug. 2019, 123 pages.

(Continued)

*Primary Examiner* — Quang T Van
(74) *Attorney, Agent, or Firm* — Stinson LLP

(57) ABSTRACT

A heater and/or a reactor system having a conductive medium and a conductor adjacent to the conductive medium is described. The system has a source of electrical energy coupled to the conductor to provide electrical energy and create a magnetic field around the conductive medium. The system produces an eddy current that heats the conductive medium. Also described are methods of heating using the heater and/or a reactor system.

25 Claims, 5 Drawing Sheets

(56) References Cited

U.S. PATENT DOCUMENTS

| | | | |
|---|---|---|---|
| 2017/0101312 | A1 | 4/2017 | Mihailowitsch |
| 2017/0130887 | A1 | 5/2017 | Eder |
| 2018/0119084 | A1* | 5/2018 | Tuohey .................. A61L 2/081 |
| 2021/0179948 | A1 | 6/2021 | Kochendoerfer et al. |
| 2021/0325003 | A1 | 10/2021 | Weck et al. |
| 2022/0152568 | A1 | 5/2022 | Bker et al. |
| 2022/0234020 | A1 | 7/2022 | Posselt et al. |
| 2023/0098601 | A1 | 3/2023 | Shustov et al. |
| 2023/0132471 | A1 | 5/2023 | Jordens et al. |
| 2023/0356171 | A1 | 11/2023 | Jenne et al. |
| 2024/0207811 | A1 | 6/2024 | Zellhuber et al. |
| 2024/0293805 | A1 | 9/2024 | Youngren et al. |

FOREIGN PATENT DOCUMENTS

| | | | |
|---|---|---|---|
| WO | 2023046943 | A1 | 3/2023 |
| WO | 2023152162 | A1 | 8/2023 |

OTHER PUBLICATIONS

Wismann et al., "Electrified methane reforming: A compact approach to greener industrial hydrogen production," Science 364, May 24, 2019, p. 756-759.

Wismann et al. "Electrified methane reforming: Understanding the dynamic interplay", Industrial & Engineering Chemistry Research, Nov. 26, 2019, 36 pages.

* cited by examiner

INDUCTION HEATING FOR PROCESS ELECTRIFICATION

CROSS-REFERENCE TO RELATED APPLICATIONS

This application claims priority to U.S. Provisional Application No. 63/454,523 filed Mar. 24, 2023, the entire disclosure of which is incorporated herein by reference.

FIELD

The present disclosure is directed to an induction heating system for conductive mediums within industrial processes.

BACKGROUND

Certain reactions and separations require the presence of external heat to promote the reaction and/or efficiently produce the desired product. Many systems of heating a reactor are known, such as fired heating. Fired heating is typically comprised of either a direct fired heating system or an indirect fired heating system. In a fired heating system (either direct or indirect), the heat is typically generated by combustion of a hydrocarbon.

However, problems may exist when the heat supplied to a fluid (e.g., in a reactor) or to a reactor system is provided by a fired heating system. For example, in a catalytic reaction system comprising a fluid within reactor tubes, the fired heating of the reactor tubes often results in uneven temperature gradients along each tube. Uneven temperature gradients along the tube can lead to premature tube failure and adversely impact throughput, catalyst life, and yield/quality of the desired products. Additionally, where multiple reactor tubes are present, there are typically temperature differences between the tubes. Temperature differences between the reaction tubes in the same reactor system results in heating inefficiencies, non-optimal throughput, and variations in the yield/quality of the desired product.

Each of these above problems are also encountered with direct heating generally (e.g., direct heating of a fluid). For example, when fired heaters are used to heat a fluid, there is typically a temperature difference along the fluid.

Furthermore, all fired heaters are subject to typical wear and tear that ultimately leads to deterioration in the energy efficiency of the fired heater. Where the fired heater comprises combustion of hydrocarbons or other materials that emit greenhouse gases such as $CO_2$, this deterioration in fired heater energy efficiency contributes to an increase in greenhouse gases released from the fired heater.

Accordingly, there remains a need in the art to develop heating processes and reaction heating systems wherein heat is provided in a more controllable and efficient manner. There also remains a need in the art for the development of heating methods wherein the emission of greenhouse gases or other pollutants are minimized or eliminated.

SUMMARY

In one embodiment, a method of heating a reactor tube is provided. The method comprises providing a reactor heating system comprising one or more reactor tubes, at least two conductors adjacent to each reactor tube, and electrically isolated therefrom, and a source of electrical energy coupled to the at least two conductors; supplying electrical energy to each of the at least two conductors of the reactor heating system; and controlling the temperature of the one or more reactor tubes by adjusting at least one of the current level and the frequency of the electrical energy supplied to the at least two conductors. The method further comprises supplying electrical energy to the at least two conductors to induce electrical currents in the one or more reactor tubes and heat the one or more reactor tube.

In another embodiment, a method of heating a reactor tube comprises providing a reactor heating system comprising one or more reactor tubes, one or more conductors adjacent to the one or more reactor tubes, and electrically isolated therefrom, a source of electrical energy coupled to the one or more conductors, and at least one temperature sensor coupled to the outlet of at least one of the one or more reactor tubes; supplying electrical energy to each of the one or more conductors of the reactor heating system; and controlling the temperature of the one or more reactor tubes by adjusting at least one of the current level and the frequency of the electrical energy supplied to the one or more conductors. The method further comprises supplying electrical energy to the conductor to induce electrical currents in the one or more reactor tubes and heat the one or more reactor tubes. The temperature of the one or more reactor tubes is controlled responsive to a temperature measured using the at least one temperature sensor.

In a still further embodiment, a method of heating a reactor tube comprises providing a reactor heating system comprising one or more conductive mediums, wherein each of the conductive mediums comprises a reactor tube, one or more conductors adjacent to each of the one or more conductive mediums and electrically isolated therefrom, and at least one source of electrical energy coupled to each of the one or more conductors; supplying electrical energy to each conductor of the one or more conductors of the reactor heating system using the at least one electrical energy source; and controlling the temperature of the one or more conductive mediums by adjusting at least one of the current level and the frequency of the electrical energy supplied to each of the one or more conductors. Electrical energy is supplied to induce electrical currents in the one or more conductive mediums and heat the one or more conductive mediums. The method further comprises at least one temperature sensor coupled to the outlet of at least one of the one or more reactor tubes, and controlling the temperature of the one or more reactor tubes responsive to a temperature measured using the at least one temperature sensor; and/or at least two conductors adjacent to each reactor tube.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
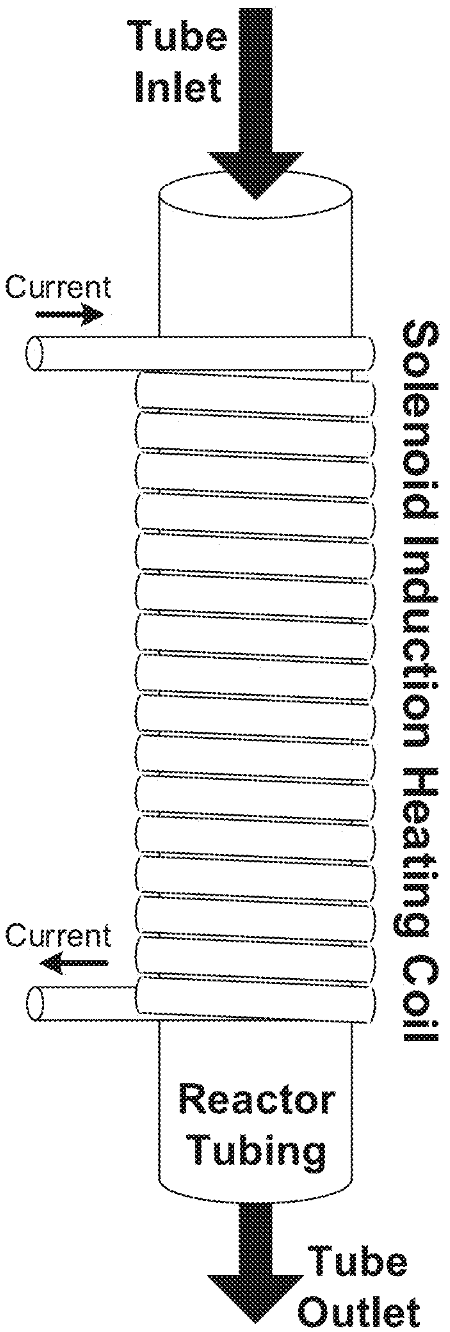
FIG. 1 illustrates a single reactor tube (conductive medium) with an insulated solenoid induction heating coil (conductor) wrapped around its exterior.

Passing an electrical current through an electrical conductor (e.g., copper wire) creates a magnetic field around the conductor. Large current flow will result in a stronger magnetic field around the conductor. When the direction of the electrical current's flow is changed, the magnetic field's direction also changes. Alternating the electrical current flow (such as in an AC system) will cause the direction of the magnetic field to alternate as well.

Placing a current-carrying electrical conductor adjacent to a conductive medium will create localized currents in the conductive medium (i.e., eddy currents). For example, winding a current carrying wire around a conductive tube or pipe will create localized currents in the tube or pipe. Larger currents supplied to the conductor create larger magnetic fields, which increase the eddy currents in the conductive medium. Because of the electrical impedance of the conductive medium, the eddy current's flow will produce heat in the conductive medium (i.e., due to $I^2R$ losses). This form of heating is referred to as "joule heating" (i.e., induction heating).

The impedance of the conductive medium will significantly influence the amount of generated heat. Higher conductive mediums (e.g., silver, aluminum, copper, etc.) require larger eddy currents (and intrinsically, larger magnetic fields) to heat than lower conductive mediums (e.g., iron, carbon steel, nickel, etc.).

Ferrous conductive mediums (i.e., containing iron) may exhibit hysteresis losses due to directional changes in the magnetic field, especially in AC systems. Hysteresis loss is a phenomenon present in a system that undergoes magnetization and demagnetization as current flows. For example, when the current (i.e., magnetizing force) increases, the magnetic flux of the conductive medium increases. However, when the current is decreased, the magnetic flux decreases at a slower rate. This phenomenon results in a hysteresis loss. The formula for hysteresis loss is as follows: $P_b=\eta*B_{max}{}^{n}*f*V$, wherein $P_b$=hysteresis loss (W); $\eta$=Steinmetz hysteresis coefficient, depending on material ($J/m^3$); $B_{max}$=maximum flux density ($Wb/m^2$); n=Steinmetz exponent; f=frequency of magnetic reversals per second (Hz); and V=volume of magnetic material ($m^3$).

Although hysteresis losses may contribute to less heat than joule heating, it will still contribute to the heating of the conductive medium. Non-ferrous conductive mediums do not create any heat from hysteresis losses.

As the surface of the conductive medium is heated, the heat is locally conducted/transferred through the conductive medium, in certain embodiments heating the contents of the conductive medium. Some "soak time" may be required to achieve the desired temperature along the entire conductive material. The soak time required will depend on the conductive medium's materials of construction, thickness and/or diameter, the magnetic field's frequency, heat losses from the conductive medium (e.g., radiated heat loss), geometry of the conductive medium, the conductive medium's proximity to the magnetic field, the impedance of the conductive medium, and so forth. In embodiments wherein the surface of the conductive medium is heated for the purpose of heating the contents of the conductive medium (e.g., the contents of a pipe), the identity and property of the contents (e.g., the fluid and/or catalyst within a pipe) may also impact the required "soak time."

Although discussion is directed herein to a conductive medium that is a pipe, tube, or reactor tube, it should be understood that the described processes and configurations are equally applicable to a heater system generally (e.g., heating a fluid generally). That is, the described processes and configurations may also be directed to heating a fluid, wherein the fluid is contained within or contacts a conductive medium, but is not present with a reactor system or a reactor tube.

Certain embodiments of the present disclosure are generally directed to a method of heating a conductive medium. For example, heating a reactor tube. In certain embodiments, the method may comprise providing a reactor system comprising a reactor tube (i.e. conductive medium), a conductor adjacent to the reactor tube, and a source of electrical energy coupled to the conductor. Electrical energy is supplied to the conductor, which induces electrical currents in the reactor tube and heats the reactor tube. In some embodiments, the electrical energy may be supplied to heat the reactor tube and its contents. The temperature of the reactor tube and/or its contents may be controlled by adjusting the electrical energy supplied to the conductor. For example, controlling the current level or the frequency of the electrical energy supplied to the conductor, in order to achieve the desired temperature.

In certain embodiments, the conductive medium is in a shape selected from the group consisting of tube-shaped, cylindrical, rectangular, oval, round, pentagonal, hexagonal, octagonal, or combinations thereof. Other shapes of conductive materials that are desired to be heated may also be used.

In one embodiment, the conductive medium comprises a material selected from the group consisting of iron, carbon steel, chromium, molybdenum, silicon, vanadium, nickel, titanium, niobium, a nickel alloy, or combinations thereof. For example, in certain embodiments, the conductive medium comprises a material selected from the group consisting of carbon steel, carbon-½Mo, 1¼Cr-½Mo, 2¼Cr-1Mo, 3Cr-1Mo, 5Cr-½Mo, 5Cr-½Mo-Si, 9Cr-1Mo, 9Cr-1Mo-V, 18Cr-8Ni, 16Cr-12Ni-2Mo, 18Cr-10Ni-3Mo, 18Cr-10Ni-Ti, 18Cr-10Ni-Nb, nickel alloy 800 H/800 HT (e.g., minimum grain size of ASTM #5 or coarser), 25Cr-20Ni, or combinations thereof.

In some embodiments, the conductive medium has a thickness of about 15 mm or less, about 14 mm or less, about 13 mm or less, about 12 mm or less, about 10 mm or less, about 9 mm or less, about 8 mm or less, about 7 mm or less, about 6 mm or less, about 5 mm or less, about 4 mm or less, about 3 mm or less, about 2 mm or less, about 1 mm or less, about 0.5 mm or less, about 0.4 mm or less, about 0.3 mm or less, about 0.2 mm or less, or about 0.1 mm or less. For example, between about 2 mm and about 15 mm, between about 3 mm and about 15 mm, between about 4 mm and about 15 mm, between about 5 mm and about 15 mm, between about 5 mm and about 14 mm, between about 5 mm and about 13 mm, between about 5 mm and about 12 mm, between about 6 mm and about 12 mm, between about 6 mm and about 11 mm, or between about 6 mm and about 10 mm.

In other embodiments, the conductive medium has an outer diameter of about 5 mm or less, about 4 mm or less, about 3 mm or less, about 2 mm or less, about 1 mm or less, or about 0.5 mm or less. For example, between about 5 mm and about 0.5 mm, between about 4 mm and about 0.5 mm, between about 3 mm and about 0.5 mm, between about 2 mm and about 0.5 mm, or between about 1 mm and about 0.5 mm.

The electrical conductor (i.e., "conductor") may be any conductor wherein, when electricity is passed through the conductor, a magnetic field is created. For example, the electrical conductor may be in the form of a wire, a cable, an electrode, or any other suitable form. In certain embodiments, the electrical conductor may comprise a metal selected from the group consisting of copper, silver, gold, aluminum, steel, or combinations thereof. In one embodiment, the electrical conductor of the present disclosure is a copper wire.

In certain embodiments, the electrical conductor may be arranged in a particular geometry or turned around the conductive medium. For example, the electrical conductor may be in the shape of a coil, a pancake, a U-shape, a S-shape, a W-shape, etc. Two common types of coils are solenoid coils and pancake coils. In one embodiment, the electrical conductor is a solenoid coil wrapped around the conductive medium (e.g., a pipe or tube).

In various embodiments, the electrical conductor may be wound or wrapped around the conductive medium. For example, the electrical conductor may have at least about 1, at least about 2, at least about 3, at least about 4, at least about 5, at least about 10, at least about 20, at least about 30, at least about 40, at least about 50, at least about 100, at least about 250, at least about 500, or at least about 1,000 turns of winding around the conductive medium. In certain embodiments, the turns of winding around the conductive medium are not an integer. For example, there may be about 50.5 turns of winding around the conductive medium.

Figure 3:
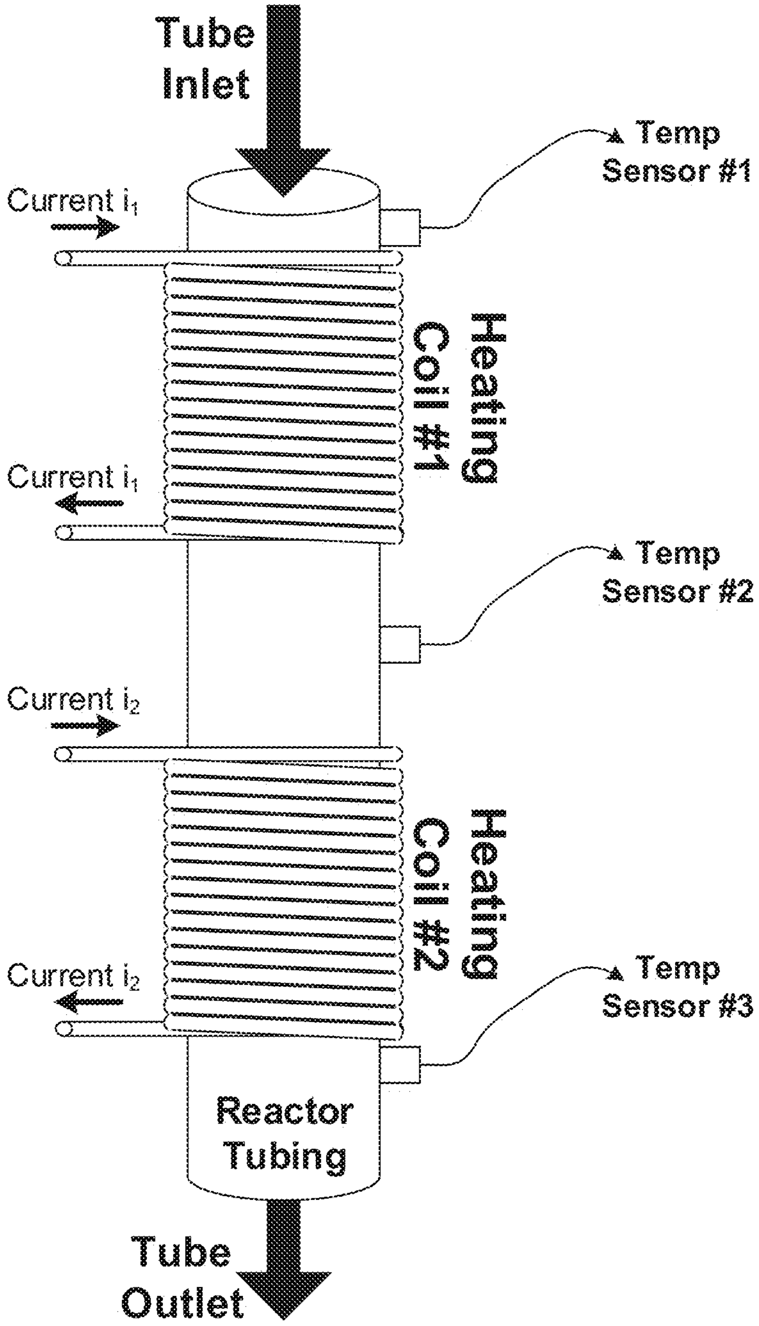
FIG. 3 illustrates a configuration where more than one induction heating coil is used to heat the same reactor tube.

In some embodiments, the system may comprise at least two conductors adjacent to each conductive medium. For example, two distinct solenoid coils may be applied around a single reactor tube. In other embodiments, at least about 3, at least about 4, at least about 5, at least about 6, at least about 7, at least about 8, at least about 9, or at least about 10 conductors may be present for each discrete conductive medium. For example, at least about 2, at least about 3, at least about 4, at least about 5, at least about 6, at least about 7, at least about 8, at least about 9, or at least about 10 distinct solenoid coils around a single reactor tube. In certain embodiment comprising at least two conductors adjacent to each discrete conductive medium, the system may be arranged such that there is at least one non-overlapping portion of the conductors adjacent to the conductive medium. In still further embodiments, the system may be arranged such that the at least two conductors adjacent to each discrete conductive medium contain no overlapping portion. For example, as shown in FIG. 3 and discussed in further detail below, two solenoid coils wound around a reactor tube with no overlapping coils on the reactor tube. The discrete conductors may comprise the same or different materials of construction. In certain embodiments, the first conductor and the second conductor are both solenoid coils comprising the same metal.

Although reference is made herein to an electrical conductor that is a wire, solenoid coil, etc., it will be understood that the present disclosure is equally applicable to other conductors and configurations.

As described elsewhere herein, electrical energy is supplied to the conductor to form a magnetic field and induce electrical currents in the adjacent conductive medium (e.g., an eddy current). This current heats the conductive medium and/or its contents.

The strength of the magnetic field produced by providing energy to the conductor decreases as the distance from the conductive medium increases. Therefore, the eddy currents (and ultimate joule heating) are stronger when the conductive medium (e.g., tube) is adjacent to the conductor. Eddy currents induce more heating the closer they are to the surface of the conductive medium because the magnetic field is stronger on the surface. This is measured by the distance between the current-carrying conductor and the conductive medium, known as "coupling distance."

In embodiments comprising alternating electrical current flow, the frequency of the resulting alternating magnetic field also influences the process of induction heating. Specifically, the penetration of the heating (or heating depth) is impacted. A higher frequency (i.e., change in the rate at which the magnetic field is alternating) decreases the heating penetration, while a lower frequency increases the heat penetration. Additionally, higher frequencies transfer more energy more quickly than lower frequencies. The optimum frequency range is determined by the tube dimensions, tube material, geometry of the tube and coil, and the required penetration depth. Assuming a fixed current magnitude, the frequency and heat penetration are inversely proportional. That is, increasing the frequency reduces the heat penetration.

In certain embodiments, the heat penetration depth of the methods and systems described herein is a function of the current level, frequency, and the materials of construction of the conductive medium (i.e. reactor tube). As such, the heat penetration depth can be adjusted by modifying one or more of these factors. For example, the current level and frequency may be adjusted by evaluating the temperature and penetration depth of the conductive medium during operation, and using a feedback loop to adjust these parameters to achieve the desired conditions.

In certain embodiments, the ratio of heat penetration depth to tube diameter is about 1:8 or less, about 1:9 or less, about 1:10 or less, about 1:12 or less, about 1:14 or less, about 1:16 or less, about 1:18 or less, or about 1:20 or less.

In certain embodiments, the ratio of electrical current penetration depth to tube diameter is about 1:8 or less, about 1:9 or less, about 1:10 or less, about 1:12 or less, about 1:14 or less, about 1:16 or less, about 1:18 or less, or about 1:20 or less.

In various embodiments, the frequency of the magnetic field can be a low frequency from about 50 Hz to about 1 kHz, from about 75 Hz to about 1 kHz, from about 100 Hz to about 1 kHz, from about 150 Hz to about 1 kHz, from about 200 Hz to about 1 kHz, from about 250 Hz to about 1 kHz, or from about 500 Hz to about 1 kHz. In some embodiments, the frequency of the magnetic field can be a medium frequency of from about 20 kHz to about 40 kHz. In other embodiments, the frequency of the magnetic field can be a high frequency of from about 40 kHz to about 200 kHz, from about 60 kHz to about 200 kHz, from about 80 kHz to about 200 kHz, from about 100 kHz to about 200 kHz, or from about 150 kHz to about 200 kHz. In still further embodiments, the frequency of the magnetic field can be an ultra-high frequency of greater than about 200 kHz.

Certain embodiments of the present disclosure are directed to the heating of a conductive medium such that a majority of the heat produced is absorbed by the conductive medium or its contents (e.g., a reactor pipe or tube and/or the fluid within the reactor pipe or tube). In some embodiments, the heat loss from the conductive medium can be less than about 10%, less than about 9%, less than about 8%, less than about 7%, less than about 6%, less than about 5%, less than about 4%, less than about 3%, less than about 2%, or less than about 1% of the total energy supplied to the system.

The systems and methods of the present disclosure comprise at least one source of electrical energy coupled to the conductor. The source of electrical energy may be any suitable source. In one embodiment, the electrical energy source may include at least one energy source with a lower carbon emissions factor. For example, renewable energy sources such as solar, wind, hydro, tidal. The electrical energy provided to the system may be alternating current (AC) or direct current (DC). Although the electrical energy may be AC or DC, inductive heating typically requires the introduction of an alternating current to the conductor to induce currents in the conductive material and produce heat. In certain embodiments, the energy source includes an AC three-phase power source. In polyphase power configurations, at least one of the phases should be capable of being applied to the conductor.

In various embodiments, the conductive medium is a reactor tube through which a fluid or reactant is passed. The fluid or reactant may be, for example, a liquid, a vapor, a gas, or a combination thereof. When heat is supplied, it may be supplied to the tube and/or the contents of the tube through the various method discussed herein. The reactant may be reacted with or without a catalyst. That is, a catalyst may be disposed within the tube, depending on the requirements of the reaction. The catalyst may be, for example, a solid, liquid, or gaseous catalyst. In one embodiment, the catalyst is a solid catalyst.

The temperature of the conductive medium may be controlled by varying the current flow through the conductor, frequency and/or magnitude of the alternating current flow through the conductor, and the heat penetration of the conductive medium. In certain embodiments, at least one of the current level (e.g., alternating current magnitude) and its frequency from the electrical energy supplied to each conductor is adjusted in order to control the temperature of the reactor tube. For example, the temperature of a reactor tube (and by extension, the fluid contained within) can be controlled by varying the current flow through a solenoid coil wrapped around the reactor tube. The electrical current penetration, and by extension the heat penetration depth, of the tube can be controlled by varying the frequency of the alternating current through the coil. The ability to control magnitude and/or frequency of the alternating current flow through the coil provides more precise temperature control and is extremely suitable for power electronics control methods.

As noted above, the system may comprise multiple conductors adjacent to each conductive material. In certain embodiments, the system may be arranged such that the power supplied to each conductor (i.e. current flow or frequency and/or magnitude of the alternating current) is independently controlled. In one embodiments, a separate source of electrical energy is supplied to each distinct conductor. In another embodiment, a source of electrical energy may be utilized which supplies energy to two or more conductors, but is capable of varying the energy supplied to each conductor independently. In still further embodiments, source(s) of electrical energy may be utilized which supply energy to two or more conductors, and which supply consistent power (i.e. current flow or frequency and/or magnitude of the alternating current) to each conductor connected to the source of electrical energy. In each of these configurations, the temperature of the conductive medium (e.g., reactor tube) can be controlled as described above.

The heating methods and systems of the present disclosure present numerous operational advantages and safety benefits over previously known heating methods. Electric induction heating does not use an open flame, which is potentially dangerous in many industrial processes. Electrical control systems incur much less "wear and tear" than traditional mechanical control systems. For example, power electronics typically have a greater lifespan and durability than control valves. Electrical systems, such as those described herein, also have multiple inherent redundancies designed into the system for tripping circuits and clearing faults should the need arise. Direct electrical heating systems may require current flow on metal surfaces and increase galvanic concerns. In contrast, the present disclosure is directed to heating of a conductive medium with an electrical conductor by generating localized currents, magnetic fields, and heating via electrical impedance. In the systems and methods of the present disclosure, risks associated with voltage potentials directly on the surface of the heater or reactor tubes are minimized.

In certain embodiments the heating methods and systems of the present disclosure may further comprise electrically isolating each of the one or more conductive mediums from other electrically conductive components in the heater and/or reactor system. For example, in certain embodiments, there may be no direct connection between the conductive medium(s) and one or more conductive material(s).

In further embodiments, the heating methods and systems of the present disclosure may also include one or more safety alarms based on the energy and temperature analytics associated with discrete induction coils, conductive medium(s), and material to be heated.

FIG. 1 illustrates an exemplary embodiment, with a single reactor tube (conductive medium) having an insulated solenoid induction heating coil (electrical conductor) wrapped around its exterior. As current flows into the top winding and out of the bottom winding of the coil, a magnetic field is created. Changing the direction of the current (i.e., alternating the current flow) changes the direction of the magnetic field generated by the coil. Heating of the tube (i.e., the conductive medium) is generated in a direction adjacent to the windings of the coil due to the resulting eddy currents and hysteresis losses. In embodiments wherein a fluid (e.g., gases, liquids, or vapors) is passed through the heater or reactor tube, the fluid is subsequently heated.

FIG. 1 also illustrates an example of a solenoid coil. A solenoid coil may be created by winding the electrical conductor around the conductive medium (e.g., a reactor tube). The number of turns of the winding of the electrical conductor and its proximity to the conductive medium (e.g., the heater or reactor tube) may be important to controlling the overall heating of the system. For example, the electrical conductor may comprise at least about 1, at least about 2, at least about 3, at least about 4, at least about 5, at least about 10, at least about 20,at least about 30, at least about 40, at least about 50, at least about 100, at least about 250, at least about 500, or at least about 1,000 turns of winding.

Figure 2:
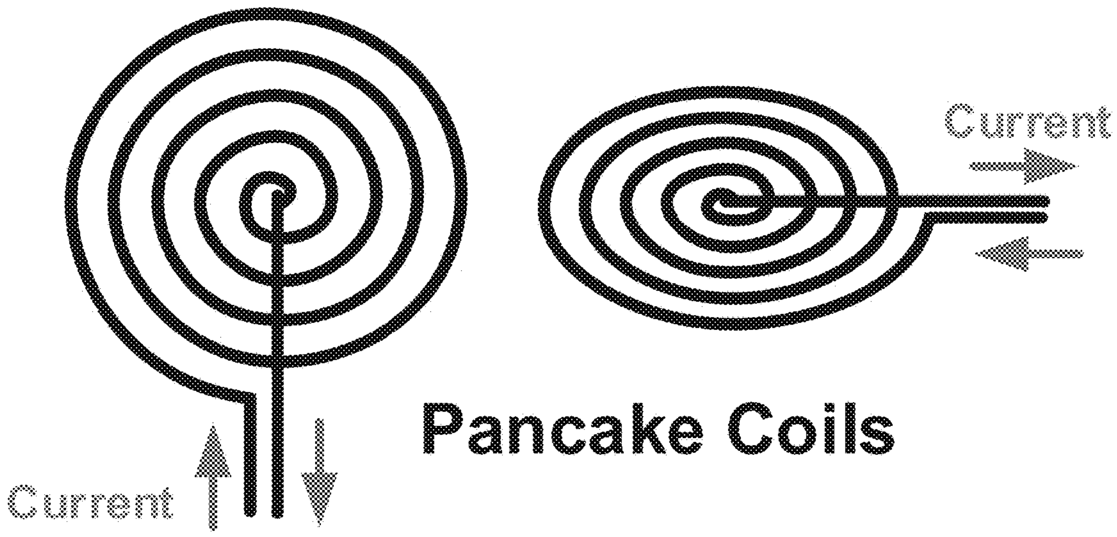
FIG. 2 shows the configuration and current flow of a pancake coil.

Alternatively, pancake coils may be created by winding the electrical conductor in a flat spiral geometric shape as shown in FIG. 2. Pancake coils may be used, for example, to heat on one side of a conductive tube or wall of a conductive reactor.

FIG. 3 illustrates a configuration where more than one induction heating coil is used to heat the same reactor tube. Any number of heating coils may be used along a single reactor tube to create multiple heating zones or locations in which heat may be produced. For example, in one embodiment, the fluid inside a single reactor tube may be heated differently (e.g., to higher or lower temperatures) at various locations along the tube. That is, different temperature gradients may be introduced. This may be useful when it is necessary or desirable to pre-heat or post-heat the fluid. It may also be useful for "burning off" residual or fouling contents on the inside (i.e., fluid flow side) of the reactor tube.

As shown in FIG. 3, multiple temperature sensors can also be applied to the reactor tube to provide temperature sensory data associated with the heater tubing and/or contents (e.g., gas, liquid, etc.). When the multiple induction heating coils are controlled independently, it is possible to better control the temperature profile of the fluid inside the reactor tube. This can be accomplished by providing the data output from the one or more temperature sensors to the electronic power controls and adjusting the temperatures supplied to each heating zone as necessary. Independently adjusting the heat produced on discrete coils allows for greater maximization of operational performance metrics such as throughput, yield, and product qualities. It also allows for a minimization of fouling and catalyst deactivation within the system.

There are several benefits of using multiple independent induction heating coils on a single tube. Independent induction heating coils can improve control of the overall heating profile of the process, allow analysis of energy use over time to identify potential issues or improve efficiency, and/or generate alarms based on energy analytics associated with independent induction heating coils.

The use of multiple heating coils allows for a more balanced electrical system through independent control of energy usage on discrete coils (e.g., using phase balancing of the coils to promote phase balancing of the facility's overall electrical system). Multiple heating coils also provide redundancy for individual coil failures by leveraging the other healthy coils to compensate and achieve the overall required temperature on a tube.

Measuring temperature on the inlet and/or outlet of independent induction coils can supplement the benefits realized by the present disclosure in a variety of manners. The electrical energy usage and subsequent heat transfer rate associated with each independent coil can be quantified. This information can then be used to achieve better temperature control of the fluid during passage through the tube, and a more efficient use of energy.

In certain embodiments, the energy usage over time may be evaluated (e.g., by analyzing usage trends) to identify potential tube fouling issues (or their onset) and catalyst activity (if a solid catalyst is disposed within the tube). The energy efficiency impacts due to tube fouling and/or tube metallurgy may be quantified by evaluating the temperature over time. Preventative maintenance or catalyst replacement may then be undertaken before the system begins to operate outside of the desired efficiency ranges.

Temperature measurement also allows for the creation of an automated system that accounts and compensates for temperature changes associated with fluctuations in the flow rate, feed composition or the catalyst activity. Generally, operating a system in one or more of the above configurations allows for greatly improved heater efficiency and subsequently reduces the overall heater stresses and maintenance costs.

Figure 4:
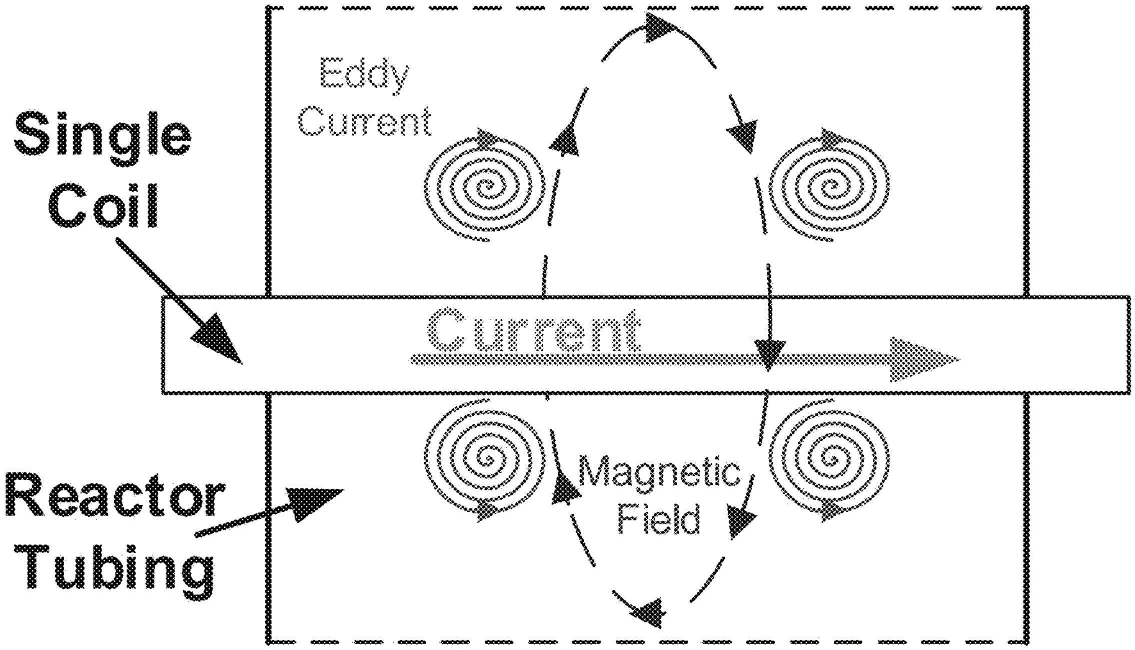
FIG. 4 illustrates the interaction between the reactor tubing (conductive medium) and a single coil of an inductive heating coil (conductor) wrapped around the exterior of the tubing.

FIG. 4 illustrates the interaction between the reactor tubing (conductive medium) and a single coil of an inductive heating coil (electrical conductor) wrapped around the exterior of the piping/tubing. As the current flows across the coil, a magnetic field is generated. This magnetic field interacts with the reactive material of the tubing to create eddy currents, which subsequently heat the tubing and its contents.

Figure 5:
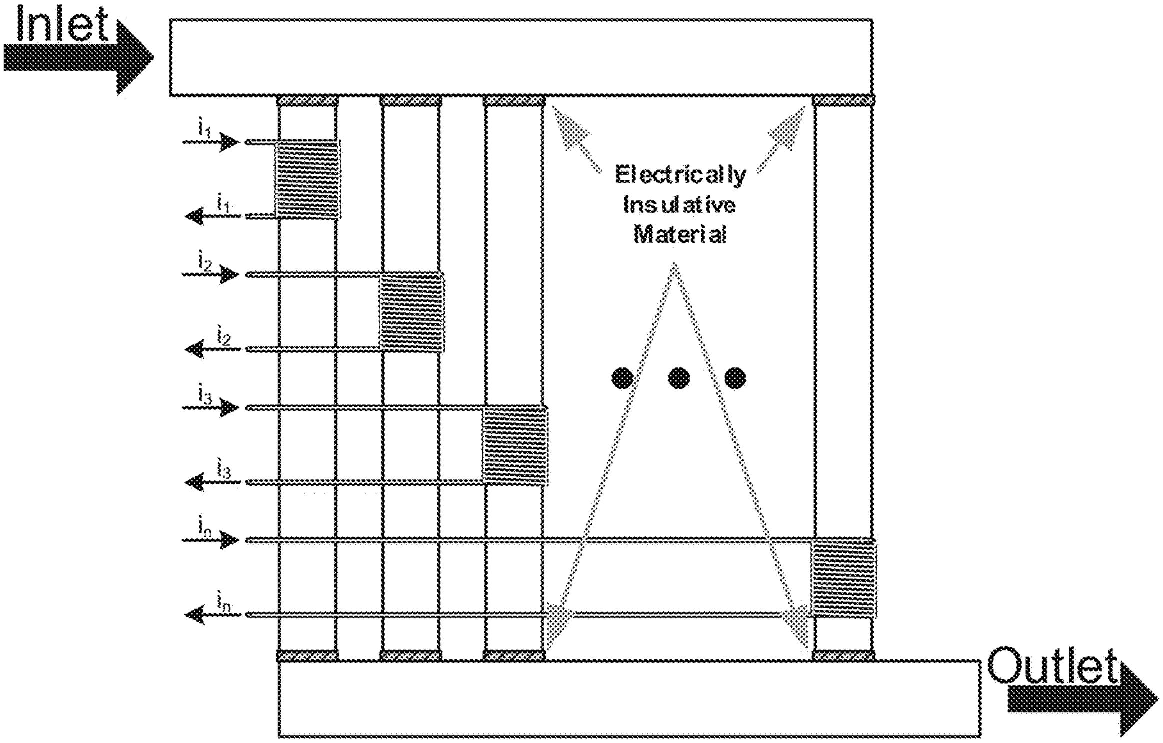
FIG. 5 illustrates electrically insulated reaction tubes.

It may be prudent (for practicality, safety, efficiency, maintenance, or other reasons) to electrically insulate the tubes on one or both ends to minimize any potential galvanic behavior that could potentially compromise the tube material. FIG. 5 provides an illustration of one embodiment of the present disclosure that implements electrically insulated reaction tubes. Electrically insulative material is shown between the tubes on the inlet and the outlet of each reaction tubes. However, various embodiments are also directed to the providing electrically insulative material on only one end of each tube. Providing electrically insulative material on either or both ends of a reaction tube will open any potential electrical current paths between the inlet and the outlet of the reactor to reduce the potential of electrically sourced and/or exacerbated galvanic reactions on the reactor tubes.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above systems and methods without departing from the scope of the disclosure, it is intended that all matter contained in the above description and shown in the accompanying drawings shall be interpreted as illustrative and not in a limiting sense.

The invention claimed is:

1. A method of heating a reactor tube, the method comprising:
- providing a reactor heating system comprising:
  - one or more reactor tubes, wherein the one or more reactor tubes comprise a catalyst disposed therein;
  - at least two conductors adjacent to each reactor tube, and electrically isolated therefrom; and
  - a source of electrical energy coupled to the at least two conductors;
- supplying electrical energy to each of the at least two conductors, wherein supplying electrical energy to the at least two conductors induces electrical currents in the one or more reactor tubes and heats the one or more reactor tubes;
- controlling the temperature of the one or more reactor tubes by adjusting at least one of the current level and the frequency of the electrical energy supplied to the at least two conductors; and
- passing a reactant through the one or more reactor tubes to react the reactant, wherein the temperature of the catalyst and the reactant passing through the one or more reactor tubes is controlled by controlling the temperature of the one or more reactor tubes.

2. The method of claim 1, wherein the at least two conductors adjacent to each reactor tube comprise at least one non-overlapping portion adjacent to each reactor tube.

3. The method of claim 1, further comprising controlling the temperature of the one or more reactor tubes by independently adjusting at least one of the current level and the frequency of the electrical energy supplied to each of the at least two conductors adjacent to each reactor tube.

4. The method of claim 1, wherein supplying the electrical energy produces a magnetic field that creates eddy currents in the one or more reactor tubes.

5. The method of claim 1, the heat penetration depth into tube is a function of the current level, frequency, and tube material.

6. The method of claim 1, further comprising:
- coupling at least one temperature sensor to at least one of the one or more reactor tubes; and measuring the temperature of the reactor tube using the at least one temperature sensor, wherein controlling the temperature of the one or more reactor tubes is responsive to the measured temperature.

7. The method of claim 6, wherein the at least one temperature sensor is positioned at the outlet of at least one of the one or more reactor tubes.

8. The method of claim 1, wherein the at least two conductors adjacent to each reactor tubes are a wire.

9. The method of claim 8, wherein each of the one or more reactor tubes comprises at least two conductors in the form of a wire coiled around the reactor tube.

10. The method of claim 1, wherein the catalyst is a solid, liquid, or gaseous catalyst.

11. The method of claim 1, wherein the reactant is a liquid, a vapor, a gas, or a combination thereof.

12. The method of claim 1, wherein the temperature of the one or more reactor tubes, the reactant, and the catalyst are controlled by adjusting at least one of the current level and frequency of the electrical energy supplied by the electrical energy source.

13. The method of claim 1, wherein the source of electrical energy includes at least one energy source with a low carbon emissions factor, such as solar, wind, hydro, or tidal.

14. The method of claim 1, wherein the one or more reactor tubes comprise a ferrous material.

15. The method of claim 1, further comprising:

electrically isolating each of the one or more reactor tubes from other electrically conductive components in the reactor heating system.

16. The method of claim 1, wherein the reactor heating system comprises more than one reactor tube; and wherein at least one of the current level and frequency of the electrical energy supplied to each of the conductors is independently adjusted to independently control the temperature of each reactor tube.

17. The method of claim 1, wherein the electrical energy source includes at least one of a single-phase, two-phase, and three-phase power source.

18. The method of claim 17, wherein the electrical energy source includes a three-phase power source, at least one phase of the three-phase power source is capable of being applied to at least one of the conductors adjacent to the one or more reactor tubes.

19. A method of heating a reactor tube, the method comprising:

providing a reactor heating system comprising:

one or more reactor tubes, wherein the one or more reactor tubes comprise a catalyst disposed therein;

one or more conductors adjacent to the one or more reactor tubes, and electrically isolated therefrom;

a source of electrical energy coupled to the one or more conductors; and at least one temperature sensor coupled to the outlet of at least one of the one or more reactor tubes;

supplying electrical energy to each of the one or more conductors, wherein supplying electrical energy to the conductor induces electrical currents in the one or more reactor tubes and heats the one or more reactor tubes; and controlling the temperature of the one or more reactor tubes by adjusting at least one of the current level and the frequency of the electrical energy supplied to the one or more conductors, wherein controlling the temperature of the one or more reactor tubes is responsive to a temperature measured using the at least one temperature sensor.

20. The method of claim 19, wherein each of the one or more reactor tubes comprises a temperature sensor coupled to the outlet of the reactor tube.

21. The method of claim 19, wherein at least one of the one or more reactor tubes comprises a first temperature sensor coupled to the inlet of the reactor tube and a second temperature sensor coupled to the outlet of the reactor tube.

22. The method of claim 19, wherein each of the one or more reactor tubes comprises a first temperature sensor coupled to the inlet of the reactor tube and a second temperature sensor coupled to the outlet of the reactor tube.

23. The method of claim 19, wherein each of the one or more reactor tubes comprises one or more conductors in the form of a wire coiled around the reactor tube.

24. A method of heating a reactor tube, the method comprising:

providing a reactor heating system comprising:

one or more conductive mediums, wherein each of the conductive mediums comprises a reactor tube and each reactor tube comprises a catalyst disposed therein;

at least two conductors adjacent to each of the one or more conductive mediums and electrically isolated therefrom; and at least one source of electrical energy coupled to each of the at least two conductors;

supplying electrical energy to each conductor of the at least two conductors using the at least one electrical energy source, wherein supplying electrical energy induces electrical currents in the one or more conductive mediums and heats the one or more conductive mediums; and controlling the temperature of the one or more conductive mediums by adjusting at least one of the current level and the frequency of the electrical energy supplied to each of the at least two conductors adjacent to each of the one or more conductive mediums.

25. The method of claim 24, wherein the method further comprises passing a reactant through the one or more reactor tubes to react the reactant, wherein the temperature of the catalyst and the reactant passing through the one or more reactor tubes is controlled by controlling the temperature of the one or more reactor tubes.

* * * * *